(12) United States Patent
Hilger et al.

(10) Patent No.: US 6,242,052 B1
(45) Date of Patent: Jun. 5, 2001

(54) TRIBOELECTRIC CHARGEABLE COATING POWDER

(75) Inventors: Christoph Hilger; Rolf Boysen; Helmut Riestenpatt, all of Münster; Ulrike Schlösser, Ludwigshafen; Erwin Czech, Biblis; Udo Mayer, Frankenthal; Gunther-Rudolf Schröder, Mannheim; Benno Sens, Neustadt/Weinstrasse, all of (DE)

(73) Assignee: BASF Coatings AG, Muenster-Hiltrup (DE)

( * ) Notice: Subject to any disclaimer, the term of this patent is extended or adjusted under 35 U.S.C. 154(b) by 0 days.

(21) Appl. No.: 09/380,184

(22) PCT Filed: Nov. 25, 1998

(86) PCT No.: PCT/EP98/07607

§ 371 Date: Nov. 15, 1999

§ 102(e) Date: Nov. 15, 1999

(87) PCT Pub. No.: WO99/28396

PCT Pub. Date: Jun. 10, 1999

(30) Foreign Application Priority Data

Nov. 28, 1997 (DE) .............................................. 197 52 759

(51) Int. Cl.$^7$ ................. B05D 1/06; B05D 3/02
(52) U.S. Cl. .................... 427/474; 427/475; 427/485; 427/385.5
(58) Field of Search .................... 427/474, 475, 427/485, 385.5

(56) References Cited

U.S. PATENT DOCUMENTS

| | | |
|---|---|---|
| 3,341,580 | 9/1967 | Hechenbleikner . |
| 3,477,990 | 11/1969 | Dante et al. . |
| 3,781,379 | 12/1973 | Theodore et al. . |
| 3,867,480 | * 2/1975 | Fujiyoshi et al. . |
| 4,091,048 | 5/1978 | Labana et al. . |
| 4,849,283 | 7/1989 | Porter, Jr. et al. . |
| 5,055,524 | 10/1991 | Pettit, Jr. et al. . |

FOREIGN PATENT DOCUMENTS

| | | |
|---|---|---|
| 756693 | 9/1970 | (BE) . |
| 22 14 650 B2 | 3/1972 | (DE) . |
| 27 33 468 | 7/1977 | (DE) . |
| 27 49 576 A1 | 11/1977 | (DE) . |
| 0 299 420 A2 | 7/1988 | (EP) . |
| 0 322 827 B1 | 12/1988 | (EP) . |
| 0 347 695 A3 | 6/1989 | (EP) . |
| 0 509 392 A1 | 4/1992 | (EP) . |
| 0 509 393 A1 | 4/1992 | (EP) . |
| 0 517 536 B1 | 6/1992 | (EP) . |
| 0 590 446 A2 | 9/1993 | (EP) . |
| 9-324140 | * 12/1997 | (JP) . |

OTHER PUBLICATIONS

Derwent Publications Ltd., London, GB; AN 97–064041, SU 1603754, 5/1996.
Derwent Publications Ltd., London, GB; AN 82–13131 SU 825567, 4/1981.

* cited by examiner

Primary Examiner—Erma Cameron

(57) ABSTRACT

The present invention relates to triboelectrically chargeable powder coating materials to which benzimidazole-based additives are added.

15 Claims, No Drawings

TRIBOELECTRIC CHARGEABLE COATING POWDER

FIELD OF THE INVENTION

The invention relates to powder coating materials which through the use of an additive are particularly suitable for triboelectric application equipment.

BACKGROUND ART

For some years now, powder coating materials, commonly known as powder coatings, have been finding an ever larger field of use. Powder coating materials are in the form of a dry powder which is applied in finely divided form to the surface of the article to be coated, generally with the aid of electrostatic charging, and is subsequently "dried", i.e., baked. In the course of baking, which usually takes place at temperatures between 130 and 220° C., crosslinking reactions and film formation turn the powder into a solid coating on the workpiece. Powder coating materials of this kind offer a range of advantages. For instance, the pulverized consistency of the coating material removes the need to operate with solvents. Accordingly, all of the environmental problems commonly associated with the evaporation of the solvents disappear with powder coating materials. Furthermore, a saving is made in terms of the heating energy otherwise necessary for the evaporation of the solvents. A further advantage of powder coating materials is that material which has not remained adhering to the workpiece can be collected on the floor of the powder booth and simply used again. In this way, a degree of powder utilization of up to 98% can be achieved. In addition to cost advantages, this increased degree of utilization also brings with it a far lesser degree of environmental burden than in the case of customary coating materials. Powder coating materials are prepared from binders, hardeners, fillers, pigments and additives. In respect of the binders and hardeners used, modern-day powder coating materials are generally based on one of the following polymer classes: epoxies; epoxy-polyester mixtures; polyesters; polyesters/isocyanates (polyurethanes); polyacrylates.

SUMMARY OF THE INVENTION

In powder coating technology, the powder coating materials are applied either by way of high-voltage processes, e.g., via a corona electrode, or by way of the tribo process, which is based on the triboelectric charging of the powder coating materials.

The tribo process has a number of advantages over its high-voltage counterpart. On the one hand, there is no need for high-voltage equipment; on the other, no "Farady cages" are formed since there are no electrical field lines.

A key disadvantage of the triboelectric charging of current powder coating materials is the inadequate deposition rate of the powder coating materials on the workpiece. Powder particles having an average diameter <10 μm, in particular, frequently give rise to problems in coating practice, since they have a poor degree of deposition on the workpiece in the tribo process.

In order to improve the deposition rate of triboelectrically applied powder coating materials, the prior art has taken recourse to specific binders or has added to the powder coating materials additives, such as aluminum oxide in the so-called dry-blend process. The powder coating materials prepared in this way must, however, be specially adjusted in their particle size spectrum; i.e., the fraction of powder particles having an average particle diameter <10 μm must be reduced.

The present invention has set itself the object of providing powder coating materials, and additives for powder coating materials, which are improved over the prior art in respect of the triboelectric applicability.

This object is achieved in accordance with the invention by means of a powder coating material which comprises an additive of the formula I

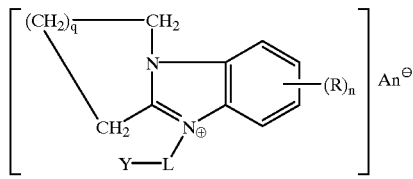

in which
R=hydrogen, chloro, methyl
L=hydrogen, $C_4$–$C_{22}$ alkyl or 2-phenylethyl or $C_2$–$C_{10}$ alkylene, $C_4$–$C_{10}$ alkenylene or a radical of the formula

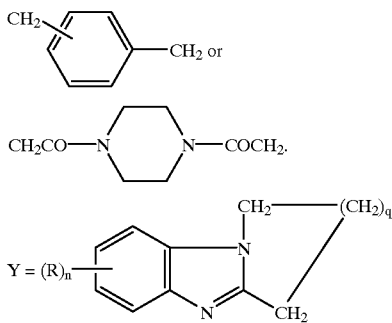

if L is not=hydrogen,
$An^-$=one equivalent of an anion, and n=0, 1 or 2.
$C_2$–$C_{10}$ alkylene radicals are, for example, $(CH_2)_2$, $(CH_2)_3$, $(CH_2)_4$, $(CH_2)_5$, $(CH_2)_6$, $(CH_2)_7$, $(CH_2)_8$, $(CH_2)_9$, $(CH_2)_{10}$,
CH—$(CH_3)CH_2$ or $CH(CH_3)CH(CH_3)$.
$C_4$–$C_{10}$ alkenylene radicals are, for example, $CH_2CH=CHCH_2$, $CH_2CH=CH(CH_2)_2$ or $(CH_2)_2CH=CH(CH_2)_2$.
Preferred bridging links L are $C_2$–$C_8$ alkylene, $CH_2CH=CHCH_2$,

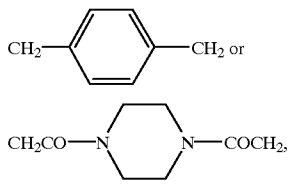

particular emphasis being given to $C_2$–$C_8$ alkylene.
Examples of suitable anions are organic or inorganic anions, examples being halides, such; as fluoride, chloride, bromide or iodide, hexafluorophosphate, tetrafluoroborate, formate, acetate, propionate, oxalate, benzenesulfonate, toluenesulfonate or tetraphenylboranate.
$F^-$, $Cl^-$, $Br^-$, $PF_6^-$, $BF_4^-$ and $I^-$, and thus r=1, are particularly preferred for $An^-$.
The powder coating materials of the invention preferably comprise additives of the following formula, which are added to the powder coating materials:

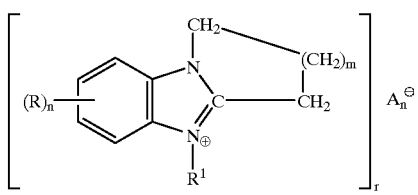

in which
R, n and An⁻ are as defined above and
$R^1$ is $C_4$–$C_{22}$ alkyl, benzyl or 2-phenylethyl or

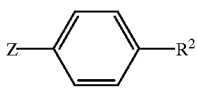

where
Z is $C_2$–$C_6$ alkylene,
$R^2$ is hydrogen, unsubstituted or hydroxyl- or $C_1$–$C_4$ alkoxy-substituted $C_1$–$C_4$ alkyl, halogen, nitro or $C_1$–$C_4$ alkanoyl,
m is 1 or 2, and
r is 1 or 2.
q is 1 or 2.

In the formula (II) $R^1$, in addition to benzylethyl and phenylethyl, is $C_4$ to $C_{22}$ alkyl. Specific examples of $R^1$ are: n- and isobutyl, n- and isopentyl, hexyl, heptyl, n- and isooctyl, 2-ethylhexyl, nonyl, decyl, dodecyl, tetradecyl, hexadecyl, stearyl, eicosyl and doeicosyl, the alkyl groups being linear or branched.

$R^1$ is preferably benzyl or $C_{10}$ to $C_{22}$ alkyl, especially $C_{12}$–$C_{22}$ alkyl.

Particular preference is given to compounds (II) in which $R^1$ is methyl and n is 0 or 1 and $R^1$ is $C_{10}$–$C_{22}$, especially $C_{12}$–$C_{22}$ alkyl.

All alkyl or alkenylene groups appearing in formula I can be either straight-chain or branched.

Examples of substituent groups useful as $R^2$ are methyl, ethyl, propyl, isopropyl, butyl, isobutyl, sec-butyl, 2-hydroxyethyl, 2- or 3-hydroxypropyl, 2- or 4-hydroxybutyl, 2-methoxyethyl, 2- or 3-methoxypropyl, 2- or 4-methoxybutyl, 2-ethoxyethyl, 2- or 3-ethoxypropyl, 2- or 4-ethoxybutyl, fluoro, chloro, bromo, formyl, acetyl, propionyl, butyryl or isobutyryl.

Examples of additional useful substituent groups are $(CH_2)_2$, $(CH_2)_3$, $(CH_2)_4$, $(CH_2)_5$, $(CH_2)_6$, $CH(CH_3)CH_2$ or $CH(CH_3)CH(CH_3)$.

The preferred additives also include benzimidazoles of the formula III

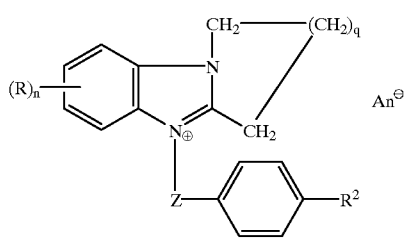

in which
n, q, R, $R^2$, Z and An⁻ are as defined above.

Particular preference is given to benzimidazoles of the formula III in which
q is 1
R is hydrogen,
$R^2$ is hydrogen or $C_1$–$C_4$ alkyl, and
Z is $C_3$–$C_6$ alkylene, and
n and An⁻ are each as defined above.

Of particular interest are benzimidazoles of the formula III in which Z is $C_3$–$C_4$ alkylene. Particular emphasis is given to the benzimidazole of the formula IV

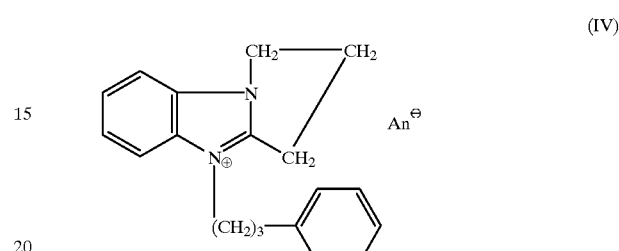

in which An⁻ is as defined above.

The benzimidazoles which can be employed with preference as additives also include compounds of the formula V

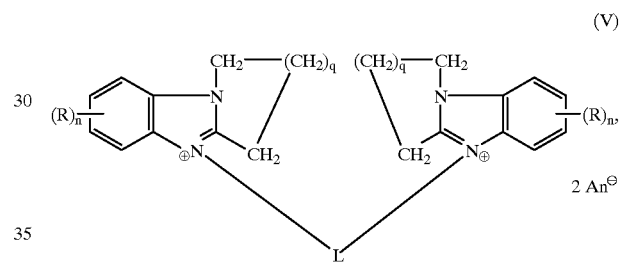

in which
n, q, the radicals R, L and An⁻ are as defined above.

All alkylene or alkenylene groups appearing in formula V can be either straight-chain or branched.

Preference is given to benzimidazoles of the formula V which have a symmetric structure.

Particular preference is given to benzimidazoles of the formula V in which
q is at each occurrence 1,
R is at each occurrence hydrogen,
L is $C_2$–$C_8$ alkylene, and
n and An⁻ are each as defined above.

Of very particular interest are benzimidazoles of the formula V in which L is $C_2$–$C_5$ alkylene.

The benzimidazoles of the formula I-V employed as additives in accordance with the invention can be obtained by methods known per se which are described, for example, in DE-A-2 733 468.

For instance, a bridged benzimidazole of the formula VI

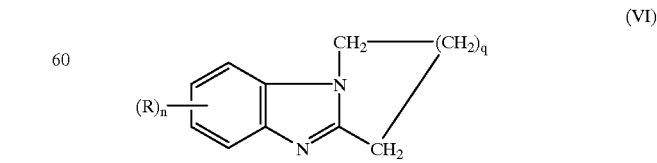

in which n, q and R are each as defined above can be reacted with a compound of the formula VII

 (VII), in which L is as defined above and X is a leaving group, e.g., chloro, bromo or iodo, and, if desired, subsequently precipitated by means of a salt of the formula VIII

 (VIII)

in which An⁻ is as defined above and M⁺ is the equivalent of a metal cation, e.g., sodium or potassium.

In accordance with the invention, said additives are added to the powder coating materials preferably in amounts of from 0.05 to 5% by weight, preferably from 0.1 to 1% by weight.

The addition of these additives can be made, for example, following the synthesis of the resins, by adding one or more additives to the resin melt, or during the final formulation of the powder coating materials, e.g., prior to the dispersing step in the extruder.

The powder coating materials of the invention are notable for particularly good triboelectric chargeability, thereby greatly increasing the transmission rate.

In principle, all types of powder coating material can be provided with the triboadditive of the invention. It is suitable both for pigmented and unpigmented powder coating materials.

In addition to the polyvinyl ether additive of the invention, the powder coating material can otherwise include all common types of powder coating material, especially those based on epoxy resins, epoxy-polyester mixtures, polyesters, polyurethanes and/or acrylate resins.

Known coating formulations can be found, for example, in EP-509 392, EP-509 393, EP-322 827, EP-517 536, U.S. Pat. No. 5,055,524 and U.S. Pat. No. 4,849,283. In particular, the powder coating material can consist of epoxy resins, including epoxidized novolaks, of crosslinking agents, preferably phenolic or amine-type hardeners or bicyclic guanidines, catalysts, fillers and also, if desired, auxiliaries and additives.

The powder coating materials employed in accordance with the invention can, for example, include epoxy resins, phenolic crosslinking agents, catalysts, assistants and also, if desired, auxiliaries and additives typical for powders, such as flow aids.

Suitable epoxy resins are all solid epoxy resins having an epoxy equivalent weight of between 400 and 3000, preferably from 600 to 2000. These are primarily epoxy resins based on bisphenol A and bisphenol F or epoxidized novolak resins. These preferably have an epoxide equivalent weight of from 500 to 1000.

The epoxy resins based on bisphenol A and bisphenol F generally have a functionality of less than 2, the epoxidized novolak resins a functionality of more than 2. In the powder coating materials of the invention, particular preference is given to epoxidized novolak resins having an average functionality in the range from 2.4 to 2.8 and having an epoxide equivalent weight in the range from 600 to 850. In the case of the epoxidized novolak resins, the phenolic hydroxyl groups are etherified with alkyl groups, acrylic groups or similar groups. By reaction of the phenolic hydroxyl groups with epichlorohydrins, epoxide groups are incorporated into the molecule. This produces, starting from novolaks, the so-called epoxy novolak. The epoxidized novolaks are structural relations of bisphenol A resins. Epoxidized novolak resins can be prepared by epoxidizing novolaks consisting, for example, of from 3 to 4 phenol nuclei linked to one another by way of methylene bridges. As novolak resins it is also possible to use alkyl-substituted phenols which are reacted with formaldehyde.

Examples of suitable epoxy resins are the products obtainable commercially under the following names:

Epikote 1004, 1055, 3003, 3004, 2017 from Shell-Chemie, DEH 640, 671, 662, 663U, 664, 667 from Dow and also Araldit GT 6063, 6064, 6084, 6097, 7004, 7220, 7225 from Ciba Geigy.

For curing the epoxy resins, the powder coating material of the invention includes phenolic or amine-type hardeners. Bicyclic guanidines may also be employed.

In this context it is possible, for example, to use any desired phenolic resin provided it has the methylol functionality required for reactivity. Preferred phenolic resins are products of the reaction under alkaline conditions of phenol, substituted phenols and bisphenol A with formaldehyde. Under such conditions, the methyl group is linked to the aromatic ring in either the ortho or para position. In accordance with the present invention, particular preference is given to the use as phenolic crosslinking agents of hydroxyl-containing bisphenol A or bisphenol F resins having a hydroxyl equivalent weight in the range from 180 to 600, with particular preference in the range from 180 to 300. Phenolic crosslinking agents of this kind are prepared by reacting bisphenol A or bisphenol F with glycidyl-containing components, such as, for example, with the diglycidyl ether of bisphenol A. Phenolic crosslinking agents of this kind are obtainable, for example, under the commercial designation DEH 81, DEH 82 and DEH 87 from Dow, DX 171 from Shell-Chemie, and XB 3082 from Ciba Geigy.

The epoxy resins and the phenolic crosslinking agents are employed here in a ratio such that the number of epoxide groups to the number of phenolic OH groups is approximately 1:1.

The powder coating materials of the invention include one or more suitable catalysts for the epoxy resin curing. Suitable catalysts are phosphonium salts of organic or inorganic acids, imidazole and imidazole derivatives, quaternary ammonium compounds, and amines. The catalysts are generally employed in proportions from 0.001% by weight to about 10% by weight, based on the overall weight of the epoxy resin and of the phenolic crosslinking agent.

Examples of suitable phosphonium salt catalysts are ethyltriphenylphosphonium iodide, ethyltriphenylphosphonium chloride, ethyltriphenylphosphonium thiocyanate, ethyltriphenylphosphonium acetate/acetic acid complex, tetrabutylphosphonium iodide, tetrabutylphosphonium bromide and tetrabutylphosphonium acetate/acetic acid complex. These and other suitable phosphonium catalysts are described, for example, in U.S. Pat. No. 3,477,990 and U.S. Pat. No. 3,341,580.

Examples of suitable imidazole catalysts are 2-styrylimidazole, 1-benzyl-2-methylimidazole, 2-methylimidazole, and 2-butylimidazole. These and other imidazole catalysts are described, for example, in Belgian Patent No. 756,693.

In some cases, commercial phenolic crosslinking agents already include catalysts for the epoxy resin crosslinking.

Examples of suitable epoxy-functional binders for transparent powder coating materials are polyacrylate resins which contain epoxide groups and can be prepared by copolymerizing at least one ethylenically unsaturated monomer which contains at least one epoxide group in the molecule with at least one further ethylenically unsaturated monomer which contains no epoxide group in the molecule, at least one of the monomers being an ester of acrylic acid or methacrylic acid.

Polyacrylate resins which contain epoxide groups are known (cf. e.g. EP-A-299 420, DE-B-22 14 650, DE-B-27 49 576, U.S. Pat. No. 4,091,048 and U.S. Pat. No. 3,781, 379).

Examples of the ethylenically unsaturated monomers which contain at least one epoxide group in the molecule are glycidyl acrylate, glycidyl methacrylate and allyl glycidyl ether.

Examples of ethylenically unsaturated monomers which contain no epoxide group in the molecule are alkyl esters of acrylic and methacrylic acid which contain 1 to 20 carbon atoms in the alkyl radical, especially methyl acrylate, methyl methacrylate, ethyl acrylate, ethyl methacrylate, butyl acrylate, butyl methacrylate, 2-ethylhexyl acrylate, and 2-ethylhexyl methacrylate. Further examples of ethylenically unsaturated monomers which contain no epoxide groups in the molecule are acids, such as acrylic acid and methacrylic acid, for example, acid amides, such as acrylamide and methacrylamide, for example, vinylaromatic compounds, such as styrene, methylstyrene and vinyltoluene, nitriles, such as acrylonitrile and methacrylonitrile, vinyl halides and vinylidene halides, such as vinyl chloride and vinylidene fluoride, vinyl esters, such as vinyl acetate, for example, and hydroxyl-containing monomers, such as hydroxyethyl acrylate and hydroxyethyl methacrylate, for example.

The polyacrylate resin containing epoxide groups normally has an epoxide equivalent weight of from 400 to 2500, preferably from 500 to 1500 and, with particular preference, from 600 to 1200, a number-average molecular weight (determined by gel permeation chromatography using a polystyrene standard) of from 1000 to 15,000, preferably from 1200 to 7000, and, with particular preference, from 1500 to 5000, and a glass transition temperature ($T_g$) of from 30 to 80, preferably from 40 to 70 and, with particular preference, from 50 to 70° C. (measured with the aid of differential scanning calorimetry (DSC)).

The polyacrylate resin containing epoxide groups can be prepared in accordance with methods which are common knowledge, by free-radical polymerization.

Examples of suitable hardeners for the polyacrylate resin which contains epoxide groups are polyanhydrides of polycarboxylic acids or mixtures of polycarboxylic acids, especially polyanhydrides of dicarboxylic acids or of mixtures of dicarboxylic acids.

Polyanhydrides of this kind can be prepared by removing water from the polycarboxylic acid or mixture of polycarboxylic acids, two carboxyl groups being reacted in each case to form one anhydride group. Preparation techniques of this kind are well known and therefore need not be elucidated further.

The powder coating materials employed in accordance with the invention can, for example, also include epoxy/polyester mixtures as the binder basis. Such powder coating materials may, for example, include A) at least one polyester having an acid number of from 25 to 120 mg KOH/g and B) at least one epoxy resin having an epoxide equivalent weight of from 400–3000.

Suitable polyester types according to A) are obtainable commercially in the trade. Examples thereof are: Crylcoat 314, 316, 340, 360 from UCB and Uralac P2450, P2980, P3560 from DSM.

Suitable epoxy resins are, for example, the products obtainable commercially under the following names: Epikote 1055, 1004, 1007, 3003, 3003-FCA-10 from Shell-Chemie, DER 662 UE, 664, 642, 672 from Dow-Chemie or Araldit GT 6063, GT 6064, GT 7072, GT 7004 from Ciba-Geigy.

The powder coating materials employed in accordance with the invention may also include mixtures of COOH-functionalized polyesters and suitable crosslinking agents. Examples of suitable crosslinking agents are the following commercially available products: Araldit PT 810, PT 910 from Ciba-Geigy and Primid XL 552 from Ems-Chemie.

COOH-functionalized polyesters which are suitable for said crosslinking agents can be obtained commercially, for example, under the following designations: Uralac P 2200, P 3485, P 3400, P 5000, P 6000, P 6600 from DSM or Crylcoat 800, 802, 803, 810, 491, 430, 440, 490, 620 from UCB.

The powder coating materials employed in accordance with the invention may also include mixtures of OH-functionalized polyesters or polyacrylate binders and suitable hardeners based on of polyisocyanates.

Examples of suitable polyisocyanate hardeners are the following commercially available products: Vestagon BF 1300, BF 1540, B 1065 from Hüls.

Examples of suitable OH-functionalized polyesters are the following commercially available products: Uralac P 1480, P 2115, P 2504, P 5504, P 1550 from DSM and Crylcoat 240, 290, 291, 2383, 690 from UCB.

An example of a commercially available OH-functionalized polyacrylate binder is Joncryl 587 from SC Johnson.

The powder coating materials contain from 50 to 90%, preferably from 60 to 80% by weight of binders and from 10 to 50% by weight, preferably from 20 to 40% by weight of fillers.

Examples of suitable fillers are glycidyl-functionalized crystalline silica modifications. Usually they are employed in the stated range of from 10 to 50% by weight, based on the overall weight of the powder coating material. In some cases, however, filler fractions of more than 50% by weight are also possible.

The crystalline silica modifications include quartz, cristobalite, tridymite, keatite, stishovite, melanophlogite, coesite, and fibrous silica. The crystalline silica modifications are glycidyl-functionalized, the glycidyl functionalization being achieved by means of a surface treatment. Examples are silica modifications based on quartz, cristobalite and fused silica which are prepared by treating the crystalline silica modifications with epoxysilanes. The glycidyl-functionalized silica modifications are obtainable commercially, for example, under the designation Silbond$^R$ 600 EST and Silbond$^R$ 6000 EST (manufacturer: Quarzwerke GmbH) and are prepared by reacting crystalline silica modifications with epoxysilanes.

The powder coating materials may additionally include further inorganic fillers, examples being titanium dioxide, barium sulfate and silicate-based fillers, such as talc, kaolin, magnesium silicates and aluminum silicates, micas and the like. In addition, the powder coating materials may also, if desired, include auxiliaries and additives. Examples of these are leveling agents, flow aids and devolatilizers, such as benzoin, for example.

The powder coating materials are prepared in accordance with known methods (cf. e.g. product information literature from BASF Lacke+Farben AG, "Pulverlacke", 1990) by homogenizing and dispersing, for example by means of an extruder, screw compounder, and the like. Following preparation of the powder coating materials, they are adjusted to the desired particle size distribution by grinding and, if appropriate, by classifying and sieving.

The present invention also relates to a process for preparing powder coating materials, which comprises adding to the powder coating materials from 0.05 to 2% by weight, preferably from 0.1 to 1.0% by weight, of additives according to the invention.

In accordance with the invention it is possible to add the additives to the powder coating materials at any desired points in time; in other words, the additives can be added both during the preparation of the powder coating material and not until directly prior to its use. A powder coating produced in accordance with the process of the invention exhibits surprising improvements in terms of the ability to process it using triboelectric application equipment.

The process of the invention is applicable to all common types of powder coating material, especially with those based on epoxy resins, epoxy-polyester mixtures, polyesters, polyurethanes and/or acrylate resins.

The additive can be added to the powder coating material in various stages of a powder coating operation. This can take place during the preparation of the powder coating material, or else not until directly prior to the application of the coating. In this way, it is left to the user to control the properties of his or her powder coating material by means of appropriate metering of the additive.

In addition to the additive, the powder coating material of the invention may also include customary devolatilizers, dulling additives, waxes for influencing the surface hardness, structural and textural additives, and also catalysts and flow aids.

What is claimed is:

1. A triboelectrically chargeable powder coating material which comprises an additive of the formula

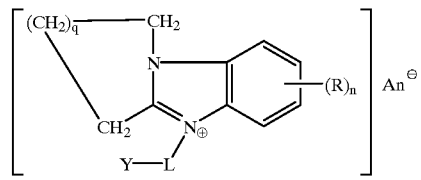

wherein:
R is selected from the group consisting of hydrogen, chloro, and methyl
L is selected from the group consisting of hydrogen. $C_4$–$C_{22}$ alkyl groups, 2-phenylethyl, $C_2$–$C_{10}$ alkylene, $C_4$–$C_{10}$ alkenylene and a radical of the formula

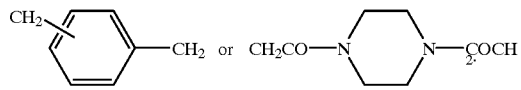

q is 1 or 2;
Y represents a compound of the formula

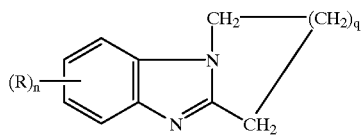

where L is a compound other than hydrogen,
when L is hydrogen, Y is not used
An⁻ represents one equivalent of an anion, and
n is 0, 1, or 2.

2. A powder coating material as claimed in claim 1, which comprises an additive of the formula

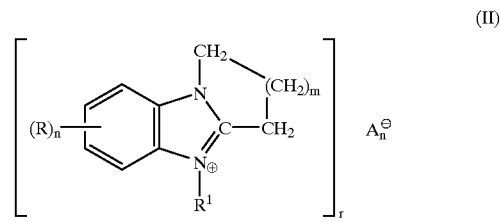

in which R, n, and An⁻ are as defined in claim 1 and $R^1$ is selected from the group consisting of
$C_4$–$C_{22}$ alkyl, benzyl 2-phenylethyl and

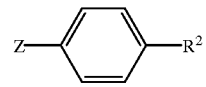

where
Z is $C_2$–$C_6$ alkylene,
$R^2$ is selected from the group consisting of hydrogen, unsubstituted, hydroxyl-substituted, $C_1$–$C_4$ alkoxy-substituted,
$C_1$–$C_4$ alkyl, halogen, nitro, and $C_1$–$C_4$ alkanoyl,
m is 1 or 2, and
r is 1 or 2.

3. A powder coating material as claimed in claim 2, which comprises an additive of the formula

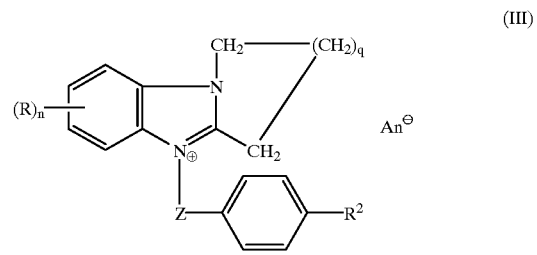

in which n, q, R, $R^2$, Z and An⁻ are as previously defined in claim 1.

4. A powder coating material as claimed in claim 1, which comprises an additive of the formula

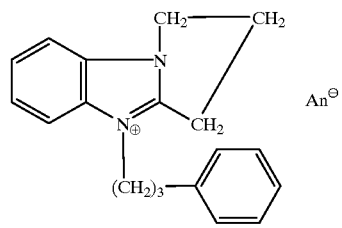

in which An⁻ is as defined in claim 1.

5. A powder coating material as claimed in claim 1, which comprises an additive of the formula

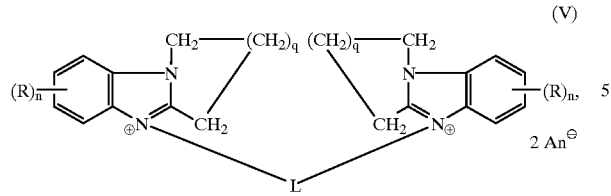

(V)

in which n, q, R, L, and An⁻ are as defined in claim 1.

6. A powder coating material as claimed in claim 1, which comprises from 0.05 to 2% by weight of the additive.

7. A powder coating material as claimed in claim 1, which further comprises aliphatic polyvinyl ethers.

8. A powder coating material as claimed in claim 7, comprising polyvinyl ethers which are homopolymers having a molar mass distribution $M_n$ of 800 to 5000.

9. A powder coating material as claimed in claim 1, which comprises powder coating materials based on a component selected from the group consisting of epoxy resins, epoxy-polyester mixtures, polyesters, polyurethanes, acrylate resins and mixtures thereof.

10. A process for preparing a powder coating material, which comprises adding the additive as set forth in claim 1 to a powder coating material, wherein said powder coating material contains a component selected from the group consisting of epoxy resins, epoxy-polyester mixtures, polyesters, polyurethanes, acrylate resins, and mixtures therof.

11. A process as claimed in claim 10, which comprises adding the polyvinyl ether as claimed in claim 8 to said powder coating material.

12. A process for triboelectrically coating substrates, which comprises using a powder coating material as claimed in claim 9 to triboelectrically coat a substrate.

13. A triboelectrically chargeable powder coating material which comprises an additive of the formula

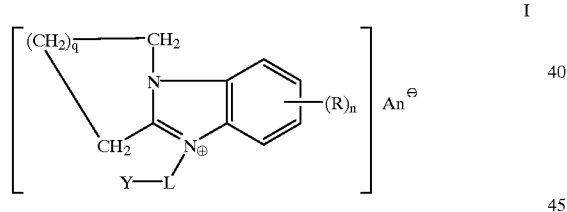

I wherein:
R is selected from the group consisting of hydrogen, chloro, and methyl;
$R_1$ is selected from the group consisting of $C_4$–$C_{22}$ alkyl benzyl 2-phenylethyl and

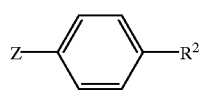

Z is $C_2$–$C_6$ alkylene,
$R^2$ is selected from the group consisting of hydrogen, unsubstituted, hydroxyl-substituted, $C_1$–$C_4$ alkoxy-substituted, $C_1$–$C_4$ alkyl, halogen, nitro, and $C_1$–$C_4$ alkanoyl, L is selected from the group consisting of hydrogen, $C_4$–$C_{22}$ alkyl groups, 2-phenylethyl, $C_2$–$C_{10}$ alkylene, $C_4$–$C_{10}$ alkenylene and a radical of the formula

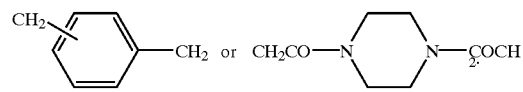

where L is other than hydrogen,
Y=

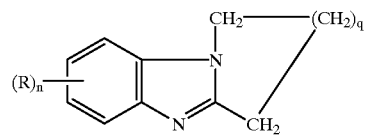

or

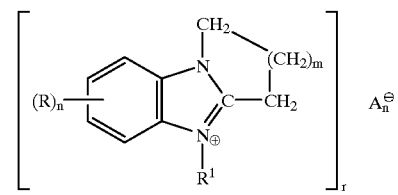

q is 1 or 2,
An⁻ represents one equivalent of an anion, and
m is 1 or 2
n is 0, 1,or 2;

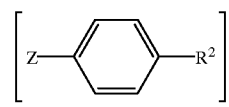

and r is 1 or 2;
said powder coating material further comprising a polyvinyl ether which is a homopolymer having a molar mass distribution between 800 and 5000; and a component selected from the group consisting of epoxy resins, epoxy-polyester mixtures, polyesters, polyurethanes, acrylate resins, and mixtures thereof.

14. A method of coating a substrate, comprising triboelectrically applying a coating of the material of claim 13 thereto, and curing the material by exposing the substrate, with the material thereon, to a temperature in a range of 130 to 230 degrees Centigrade.

15. A powder coating material as claimed in claim 7, wherein the aliphatic polyvinyl ether is polyvinyl ethyl ether.

\* \* \* \* \*